United States Patent
Kim et al.

(10) Patent No.: US 8,792,255 B2
(45) Date of Patent: Jul. 29, 2014

(54) DUTY ADJUSTER CIRCUIT AND CONVERTER INCLUDING THE SAME

(75) Inventors: Jin-Tae Kim, Seoul (KR); Kwang-Il Lee, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 202 days.

(21) Appl. No.: 13/214,653

(22) Filed: Aug. 22, 2011

(65) Prior Publication Data

US 2012/0057374 A1    Mar. 8, 2012

(30) Foreign Application Priority Data

Sep. 7, 2010  (KR) .................. 10-2010-0087647

(51) Int. Cl.
*H02M 3/335* (2006.01)
(52) U.S. Cl.
USPC ........................................... 363/21.02
(58) Field of Classification Search
CPC .............. H02M 2001/0048; H02M 3/337; H02M 3/3378
USPC ............ 363/16, 20, 21.02–21.06, 17, 24–26, 363/56, 74, 80, 97, 98, 125, 132–134; 323/356–359, 280–283
See application file for complete search history.

(56) References Cited

U.S. PATENT DOCUMENTS 7,529,108 B2 * 5/2009 Bakker .................. 363/56.02
2011/0267844 A1 * 11/2011 He et al. .................. 363/21.02

OTHER PUBLICATIONS

"A Comparison between Digital and Analog Control for a Buck Converter," R. Etz, S. Daraban, D. Petreus and A. Rusu, 33rd International Spring Seminar on Electronics Technology (ISSE), May 2010, pp. 314-319.*
"An Introduction to Digital Control of Switching Power Converters," DC DC Technical White Paper from Astec Power, Apr. 2004.*
"A New Control Method for Resonant Current Unbalance of Center-tapped Rectifier in Half Bridge LLC DC/DC Converter," J.T. Kim, B.C. Hyeon, and B.H. Cho, Proceedings of KIPE 2009, Jul. 2009, pp. 390-392.*

* cited by examiner

*Primary Examiner* — Adolf Berhane
*Assistant Examiner* — Jye-June Lee
(74) *Attorney, Agent, or Firm* — Okamoto & Benedicto LLP (57) ABSTRACT

A converter supplies output power according to a first output current and a second output current generated according to each switching operation of a first switch and a second switch. A duty adjuster circuit generates an adjuster current to compensate the difference between the peak of the first output current and the peak of the second output current to adjust duty of the first and second switches.

13 Claims, 5 Drawing Sheets

DUTY ADJUSTER CIRCUIT AND CONVERTER INCLUDING THE SAME

CROSS-REFERENCE TO RELATED APPLICATION

This application claims priority to and the benefit of Korean Patent Application No. 10-2010-0087647 filed in the Korean Intellectual Property Office on Sep. 7, 2010, the entire contents of which are incorporated herein by reference.

BACKGROUND OF THE INVENTION (a) Field of the Invention

The present invention relates to adjust duty of two switches controlling an operation of a converter.

(b) Description of the Related Art

A resonant converter includes a transformer to transmit energy. A secondary of the transformer may be made of at least two coils. The secondary coils are connected to output diodes to rectify and output a current flowing in the transformer. The currents flowing to the output diodes are currents ideally having the same peak.

Here, when a duty imbalance is generated between power switches controlling the operation of the resonant converter, the currents flowing in the output diodes have different peaks.

As a current flowing in a diode is increased, the temperature is increased, and if the temperature is increased, a forwarding voltage of the diode is decreased such that the current further flows.

Also, in terms of the duty balance status, noise generated by the parasitic component formed at the transformer, or the parasitic component of a printing circuit board pattern formed with the resonant converter, changes the peak of the output currents.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention are related to control a peak of a current flowing in an output diode.

A duty adjuster circuit according to an embodiment of the present invention adjusts duty of first and second switches in a converter supplying output power according to a first output current and a second output current generated according to each switching operation of the first switch and the second switch. The duty adjuster circuit includes an error amplifier generating an adjuster current to compensate a difference between the first output current and the second output current, and means generating information corresponding to the difference as an input of the error amplifier. The means generating the difference may be an adjuster resistor set up as a predetermined value to compensate the difference between the peaks of the first output current and the second output current.

The duty adjuster circuit may further include a reference current source supplying a reference current to the adjuster resistor, and the error amplifier may amplify the difference between the adjuster voltage generated in the adjuster resistor and the predetermined reference voltage to generate the adjuster current.

A converter according to an embodiment of the present invention includes: a first switch and a second switch; a transformer including a primary coil connected to the first and second switches and a secondary coil connected to an output terminal; an oscillator generating a duty signal controlling each switching operation of the first switch and the second switch; and a duty adjuster circuit supplying an adjuster current to the oscillator to compensate a difference between a first output current of which the current flowing in the secondary coil is rectified during a turn-on period of the first switch and a second output current of which the current flowing in the secondary coil is rectified during a turn-on period of the second switch.

The duty adjuster circuit may include an error amplifier generating the adjuster current to compensate the difference between the peak of the first output current and the peak of the second output current, and an adjuster resistor set up as a predetermined value to compensate the difference between the peaks.

The duty adjuster circuit may further include a reference current source supplying a first reference current to the adjuster resistor, and the error amplifier may amplify the difference between the adjuster voltage generated in the adjuster resistor and the predetermined reference voltage to generate the adjuster current.

The oscillator may include a capacitor charged and discharged according to the second reference current generated according to a feedback signal corresponding to the output voltage of the converter to generate an oscillator voltage, and the duty adjuster circuit may supply the adjuster current to the oscillator to charge or discharge the capacitor according to the difference between the peak of the first output current and the peak of the second output current.

The oscillator may change the level of the duty signal if the oscillator voltage arrives at a predetermined peak voltage or a predetermined minimum voltage.

A converter according to an embodiment of the present invention includes: a first switch and a second switch; a transformer including a primary coil connected to the first and second switches and a secondary coil connected to an output terminal; an oscillator generating a duty signal controlling each switching operation of the first switch and the second switch; and a duty adjuster circuit sensing a difference between a first output current of which the current flowing in the secondary coil is rectified during a turn-on period of the first switch and a second output current of which the current flowing in the secondary coil is rectified during a turn-on period of the second switch, and supplying an adjuster current to compensate the difference between the first output current and the second output current to the oscillator.

The duty adjuster circuit may include an error amplifier generating the adjuster current to compensate the different between the peak of the first output current and the peak of the second output current, and a peak error amplifier generating the output voltage corresponding to the difference between the peak of the first output current and the peak of the second output current. The error amplifier may amplify the difference between the output voltage of the peak error amplifier and a predetermined reference voltage to generate the adjuster current.

Embodiments of the present invention provide a duty adjuster circuit and a converter including the same for equally controlling the peaks of the currents flowing in the output diodes.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

In the following detailed description, only certain exemplary embodiments of the present invention have been shown and described, simply by way of illustration.

Figure 1:
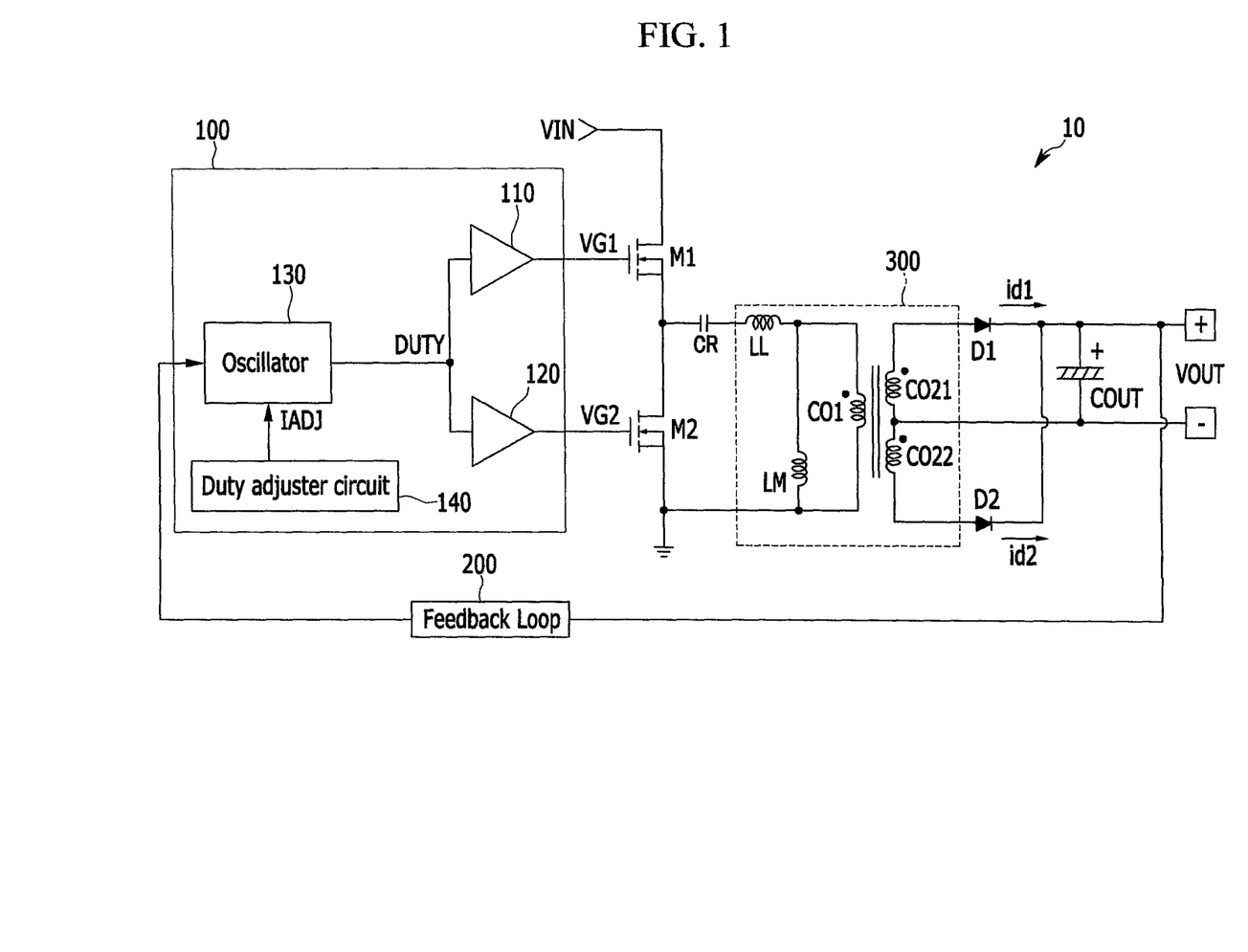
FIG. 1 is a view of a resonant converter including a duty adjuster circuit according to an exemplary embodiment of the present invention.

FIG. 1 is a view of a resonant converter including a duty adjuster circuit according to an exemplary embodiment of the present invention.

A resonant converter 10 includes a high side switch M1, a low side switch M2, a switch control unit 100, a feedback loop 200, and a transformer 300.

The output diode D1 rectifies the current of the secondary coil Co21 of the transformer 300 and controls the current flow to the output terminal (+). The output diode D2 rectifies the current flowing to the secondary coil Co22 of the transformer 300 and controls the current flow to the output terminal (+). The capacitor CO smoothes the output voltage VOUT.

The high side switch M1 and the low side switch M2 execute the switching operation with the duty according to the duty signal DUTY. The high side switch M1 is controlled by the gate signal VG1 transmitted from the switch control unit 100, and the low side switch M2 is controlled by the gate signal VG2. The high side switch M1 and the low side switch M2 according to an exemplary embodiment of the present invention are realized by a MOSFET (metal oxide semiconductor field-effect transistor) of an N-channel type. The switching operation frequency of the high side switch M1 and the low side switch M2 is referred to as a switching frequency.

The input voltage VIN is changed into a square wave by the switching operation of the high side switch M1 and the low side switch M2 such that resonance is generated between the transformer 300 and the capacitor CR. The resonance is generated between the leakage inductance LL, the magnetizing inductance LM, and the resonance capacitor CR of the transformer 300 including the primary coil CO1 and the secondary coils CO21 and CO22.

The current is generated in the secondary coils CO21 and CO22 according to the resonance current generated in the primary coil CO1 by the resonance. The output current id1 generated in the secondary coil CO21 flows to the output terminal (+) through the output diode D1, and the output current id2 generated in the secondary coil CO22 flows to the output terminal (+) through the output diode D2. The output current id1 and the output current id2 are supplied to a load, or charge the capacitor CO.

As described above, the resonant converter 10 generates the output power supplied to the load by using the output currents id1 and id2 generated according to the switching operation of the high side switch M1 and the low side switch M2.

The switch control unit 100 includes a first gate driver 110, a second gate driver 120, an oscillator 130, and a duty adjuster circuit 140.

The oscillator 130 adjusts each duty of the high side switch M1 and the low side switch M2 by using an adjuster current IADJ input from the duty adjuster circuit 140 according to an exemplary embodiment of the present invention. In detail, the oscillator 130 generates an oscillator signal VOSC (referring to FIG. 2) having different increasing and decreasing slopes by using the adjuster current IADJ, and generates the duty signal DUTY by using the oscillator signal VOSC.

When the peaks of the output current id1 and the output current id2 are different from each other, the duty adjuster circuit 140 generates the adjuster current IADJ to equally control the peak of the two currents. The difference is generated by the output currents id1 and id2 because of the noise generated by a parasitic component formed in the transformer and a parasitic component of the printing circuit board pattern including the resonant converter. The difference between the output currents id1 and id2 may be sensed by using the peak of the output current id1 and the peak of the output current id2.

To remove the parasitic component requires cost and time to again manufacture the printing circuit board and the transformer of the resonant converter. However, even if the printing circuit board and the transformer are remanufactured, the above-described parasitic component may still exist.

The duty adjuster circuit 140 generates the adjuster current IADJ that is capable of compensating the difference between the output currents caused by the parasitic component without replacement of the printing circuit board and the transformer including the parasitic component. The duty adjuster circuit 140 receives information for each peak of the output currents id1 and the output current id2 to adjust the amount of the adjuster current IADJ.

The duty adjuster circuit 140 may include an error amplifier comparing the input corresponding to the difference between the output currents id1 and id2 and a predetermined reference value to generate an adjuster current. The means to generate the input of the error amplifier may be realized by various methods.

In detail, the information for the peak difference of the output current id1 and the output current id2 is used to generate the input of the error amplifier, or the adjuster resistor to generate the adjuster current is used to generate the input of the error amplifier.

The first gate driver 110 generates the first gate signal VG1 for switching operation of the high side switch M1 according to the duty signal DUTY transmitted from the oscillator 130. The second gate driver 120 generates the second gate signal VG2 for the switching operation of the low side switch M2 according to the duty signal DUTY.

The first gate driver 110 generates the first gate signal VG1 for turning on the high side switch M1 in synchronization with the increasing edge of the duty signal DUTY, and the first gate signal VG1 for turning off the high side switch M1 in synchronization with the decreasing edge of the duty signal DUTY.

The second gate driver 120 generates the second gate signal VG2 for turning on the low side switch M2 in synchronization with the decreasing edge of the duty signal DUTY, and the second gate signal VG2 for turning off the low side switch M2 in synchronization with the increasing edge of the duty signal DUTY.

The gate drivers of the present invention are not limited thereto, and the first gate signal VG1 and the second gate signal VG2 alternately turning-on/off the high side switch M1 and the low side switch M2 according to the duty signal DUTY are generated.

The feedback loop 200 generates a feedback signal FB and transmits it to the switch control unit 100 according to the output voltage VOUT. The feedback signal FB according to an exemplary embodiment of the present invention is increased if the load is increased such that the output voltage VOUT is decreased, and is decreased if the load is decreased such that the output voltage VOUT is increased.

Hereafter, an exemplary embodiment using an adjuster resistor RADJ as the means to generate the error amplifier input of the duty adjuster circuit 140 will be described.

Figure 2:
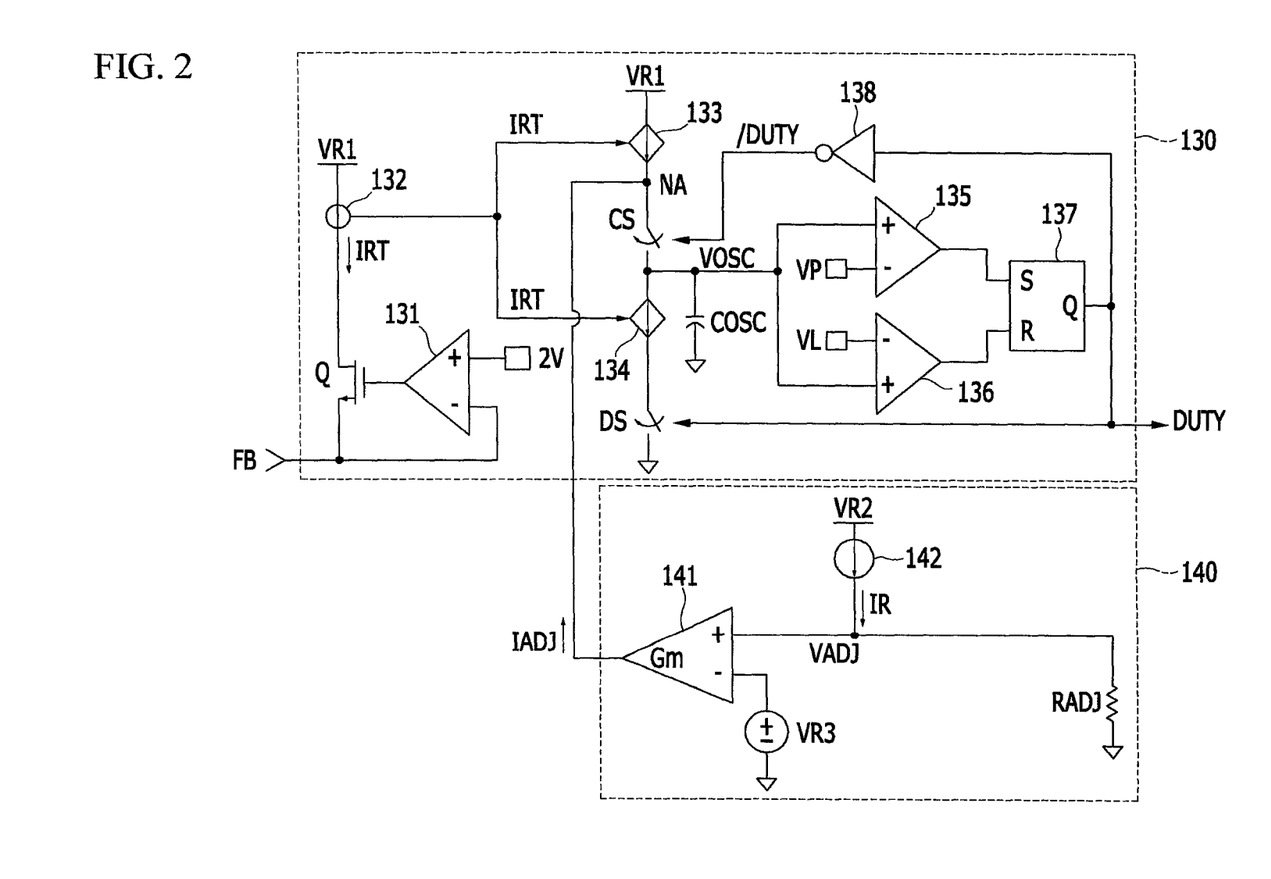
FIG. 2 is a view of an oscillator and a duty adjuster circuit according to an exemplary embodiment of the present invention.

FIG. 2 is a view of an oscillator 130 and a duty adjuster circuit 140 according to an exemplary embodiment of the present invention.

As shown in FIG. 2, the duty adjuster circuit 140 generates the adjuster current IADJ by using an adjuster resistor RADJ. In FIG. 2, the adjuster resistor RADJ is formed inside the switch control unit 100, however the present invention is not limited thereto.

Figure 3:
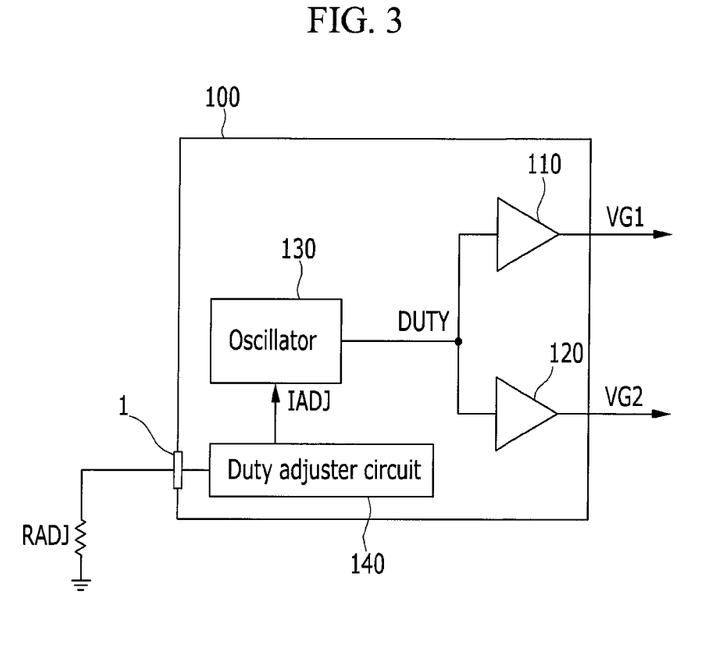
FIG. 3 is view showing an adjuster resistor positioned outside a switch control and connected to a duty adjuster circuit through a pin.

FIG. 3 is a view showing the adjuster resistor disposed outside the switch control unit and connected to the duty adjuster circuit.

As shown in FIG. 3, to set up the adjuster current IADJ by a user, the adjuster resistor RADJ may be positioned outside the switch control unit 100. In detail, the switch control unit 100 is connected to the adjuster resistor RADJ disposed outside through a pin 1, and the external resistor RADJ is connected to the duty adjuster circuit 140 through the pin 1.

Next, the oscillator 130 and the duty adjuster circuit 140 will be described with reference to FIG. 2.

The oscillator 130 generates the reference current IRT according to the feedback signal FB, and copies the reference current IRT to charge and discharge the capacitor COSC and to generate the oscillator voltage VOSC. A comparator 135 and a comparator 136 compare the oscillator voltage VOSC with the peak voltage VP and the minimum voltage VL. An SR flip-flop 137 generates the duty signal DUTY according to the comparison result.

An error amplifier 131 includes a non-inversion terminal (+) input with the reference voltage (2V) and an inversion terminal (−) input with the feedback signal FB. The output terminal of the error amplifier 131 is connected to the gate electrode of the transistor M. The source electrode of the transistor M is input with the feedback signal.

The error amplifier 131 amplifies and outputs the feedback signal FB and the error reference voltage of 2V. Accordingly, the conduction degree of the transistor M is adjusted according to the error between the feedback signal FB and the reference voltage of 2V.

As the feedback signal FB is decreased such that it is less than the reference voltage of 2V, the output voltage of the error amplifier 131 is increased. Thus, the reference current IRT output through the transistor Q is increased.

In contrast, as the feedback signal FB is increased such that it is close to the reference voltage of 2V, the output voltage of the error amplifier 131 is decreased. Thus, the reference current IRT output through the transistor M is decreased.

As described above, if the feedback signal FB is decreased according to the decreasing of the load, the switching frequency is increased such that the power supplied to the output terminal is decreased. If the feedback signal FB is increased according to the increasing of the load, the switching frequency is decreased such that the power supplied to the output terminal is increased.

A current mirror 132 coupled to a voltage reference VR1 copies the reference current IRT and transmits it to a dependent current source 133 and a dependent current source 134. In an exemplary embodiment of the present invention, the current mirror 132 copies the reference current IRT with a ratio of 1:1 and transmits it to the dependent current source 133 and the dependent current source 133. This is only a description for comprehension, and the present invention is not limited thereto.

The dependent current source 133 supplies the current for charging the capacitor COSC. The node NA is connected to wiring supplied with the adjuster current IADJ. Accordingly, during the time that the switch CS is turned on, the adjuster current IADJ charges the capacitor COSC along with the current of the dependent current source 133. During the time that the switch CS is turned on, the capacitor COSC is charged by the reference current IRT and the adjuster current IADJ supplied from the dependent current source 133 such that the oscillator voltage VOSC is increased with a constant slope. Here, the switch DS is in the turned-off state.

The dependent current source 134 supplies the current discharging the capacitor COSC. The switch CS is connected between the dependent current source 133 and the capacitor COSC. The switch DS is connected between the dependent current source 134 and the capacitor COSC.

The capacitor COSC is discharged during the time that the switch DS is turned-on such that the oscillator voltage VOSC is decreased with the constant slope. Here, the switch CS is in the turned-off state.

The two switches CS and DS are N-channel transistors. Accordingly, the switch CS is turned on and the switch DS is turned off during the period in which the duty signal DUTY is transmitted through an inverter 138 and the inversion duty signal/DUTY is the high level. The switch CS is turned off and the switch DS is turned on during the period in which the duty signal DUTY is the high level.

The charging current and the discharging current of the capacitor COSC are different from each other such that the increasing slope and the decreasing slope of the oscillator voltage VOSC are different from each other. Thus, the periods in which the duty signal is the high level and the low level are different from each other. Accordingly, the duty of the high side switch M1 and the duty of the low side switch M2 are different.

The exemplary embodiment will be described under an assumption that the output current id1 generated during the on-period of the high side switch M1 has a larger peak than the output current id2 generated during the on-period of the low side switch M2. In an exemplary embodiment of the present invention, to compensate the difference between the two currents, the adjuster current IADJ is supplied to the capacitor COSC along with the reference current IRT of the dependent current source 133.

However, the present invention is not limited thereto, and when the peak of the output current id2 is larger than the output current id1, the adjuster current IADJ may discharge the capacitor COSC along with the dependent current source 134. Here, the adjuster current IADJ is supplied to an arbitrary node between the dependent current source 134 and the switch DS.

The comparator 135 includes the non-inversion terminal (+) input with the oscillator voltage VOSC and the inversion terminal (−) input with the peak voltage VP. If the input of the non-inversion terminal (+) is more than the input of the inversion terminal (−), the comparator 135 outputs the high level, or otherwise, the comparator 135 outputs the low level.

The comparator 136 includes the inversion terminal (−) input with the oscillator voltage VOSC and the non-inversion terminal (+) input with the minimum voltage VL. If the input of the non-inversion terminal (+) is more than the input of the inversion terminal (−), the comparator 136 outputs the high level, or otherwise, the comparator 136 outputs the low level.

The SR flip-flop 137 includes a set terminal S input with the output of the comparator 135, a reset terminal R input with the output of the comparator 136, and an output terminal Q. The SR flip-flop 137 outputs the duty signal DUTY of the high level through the output terminal Q in synchronization with the increasing edge of the input of the set terminal S, and the SR flip-flop 137 outputs the duty signal DUTY of the low level through the output terminal Q in synchronization with the increasing edge of the input of the reset terminal R.

Accordingly, if the oscillator voltage VOSC is increased to the peak voltage VP, the SR flip-flop 137 generates the duty signal DUTY of the high level, the switch CS is turned off, and the switch DS is turned on. Thus, the oscillator voltage VOSC starts to be decreased. If the decreased oscillator voltage VOSC is decreased to the minimum voltage VL, the SR flip-flop 137 generates the duty signal DUTY of the low level, the switch DS is turned off, and the switch CS is turned on. Thus, the oscillator voltage VOSC starts to be increased.

The duty adjuster circuit 140 includes an error amplifier 141, a reference current source 142, and an adjuster resistor RADJ.

The reference current source 142 is coupled to a voltage reference VR2 and supplies the reference current IR to the adjuster resistor RADJ. The adjuster voltage VADJ is generated by the adjuster resistor RADJ, and the adjuster voltage VADJ is input to the non-inversion terminal (+) of the error amplifier 141.

The error amplifier 141 amplifies the error of which the input of the inversion terminal (−) is subtracted from the input of the non-inversion terminal (+) into the predetermined gain Gm to generate the adjuster current IADJ. The reference voltage VR3 is supplied to the inversion terminal (−) of the error amplifier 141. Accordingly, the error amplifier 141 amplifies the difference between the adjuster voltage VADJ and the reference voltage VR to generate the adjuster current IADJ.

The adjuster resistor RADJ may be set up as an appropriate value that is capable of compensating the difference of the peaks of the output current id1 and the output current id2.

In this embodiment, the example that the peak of the output current id1 is larger than the peak of the output current id2 is described. The present invention is not limited thereto, and when the peak of the output current id2 is larger than the peak of the output current id1, to decrease the duty of the low side switch M2, the decreasing slope of the oscillator voltage VOSC may be increased. In the case, the adjuster current IADJ as a sink type may reduce the discharging time of the capacitor COSC.

Also, as described above, the duty adjuster circuit 140 does not use the adjuster resistor RADJ, but uses the difference of the peak of the output currents id1 and id2, and thereby generates the adjuster current IADJ. The duty adjuster circuit 140 senses the difference between the peaks of the output current id1 and the output current id2 and generates the adjuster current IADJ corresponding to the differences between the peak current of the two output currents id1 and id2. Here, the information of the peak current of two output currents id1 and id2 may be generated by using a sensor capable of directly measuring the output currents id1 and id2.

In detail, the duty adjuster circuit 140 may further include a peak error amplifier 143 calculating the difference between the peak current of the output current id1 and the peak current of the output current id2 and inputs it to the non-inversion terminal (+) of the error amplifier 141 (referring to FIG. 2).

Here, the reference voltage VR4 input to the inversion terminal (−) of the error amplifier 141 may be appropriately changed to generate the adjuster current.

Figure 4:
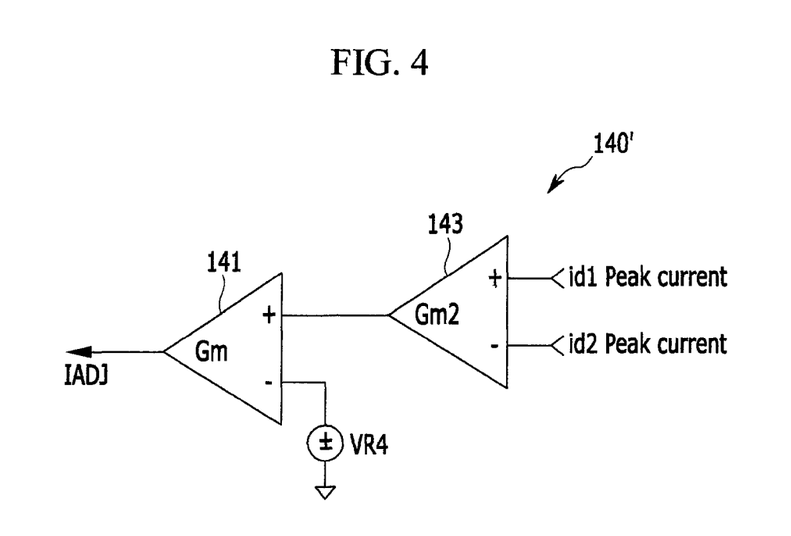
FIG. 4 is a view of a duty adjuster circuit according to another exemplary embodiment of the present invention.

FIG. 4 is a view of a duty adjuster circuit according to another exemplary embodiment of the present invention.

As shown in FIG. 4, a duty adjuster circuit 140' further includes a peak error amplifier 143 with a gain Gm2 instead of the adjuster resistor.

Each peak current information of the output currents id1 and id2 is input to the non-inversion terminal (+) and the inversion terminal (−) of the peak error amplifier 143 through the sensor, and the output of the peak error amplifier 143 is input of the non-inversion terminal (+) of the error amplifier 141.

This case is the same as the duty adjuster circuit 140 using the adjuster resistor and the operation thereof. When the peak of the output current id1 is larger than the peak of the output current id2, the duty adjuster circuit 140 generates the adjuster current IADJ to decreasing the duty of the high side switch M1. Here, the adjuster current IADJ charges the capacitor COSC along with the current of the dependent current source 133 of the oscillator 130.

In contrast, when the peak of the output current id2 is larger than the peak of the output current id1, the duty adjuster circuit 140 generates the adjuster current IADJ to decrease the duty of the low side switch M2. The generated adjuster current IADJ is transmitted to the oscillator 130. Here, the adjuster current IADJ discharges the capacitor COSC along with the current of the dependent current source 134 of the oscillator 130.

The oscillator 130 generates the duty signal controlling the duty of the high side switch M1 and the low side switch M2 according to the adjuster current IADJ. When the peak of the output current id1 is larger than the peak of the output current id2, the oscillator 130 charges the capacitor COSC by using the adjuster current IADJ such that the duty of the high side switch M1 is decreased. When the peak of the output current id2 is larger than the peak of the output current id1, the oscillator 130 discharges the capacitor COSC by using the adjuster current IADJ such that the duty of the low side switch M2 is decreased.

Next, an operation in which the peak difference between the output current id1 and the output current id2 is decreased will be described with reference to FIG. 5 according to an exemplary embodiment of the present invention.

Figure 5:
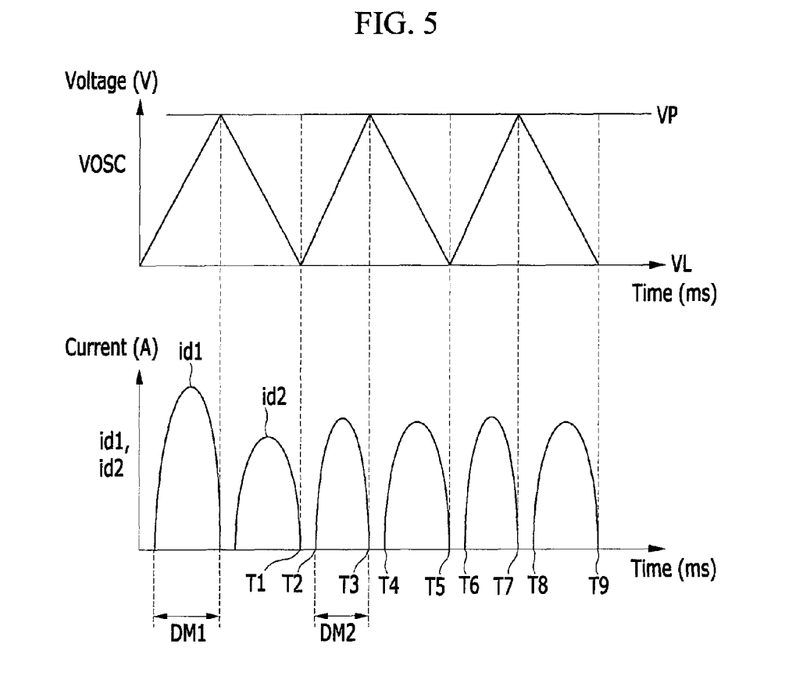
FIG. 5 is a view showing an oscillator voltage and two output currents according to an exemplary embodiment of the present invention.

FIG. 5 is a view showing an oscillator voltage and two output currents according to an exemplary embodiment of the present invention.

The time T1 is the time that the adjuster current IADJ starts to be supplied to the oscillator 130.

The peak of the output current id1 is larger than the peak of the output current id2 before the time T1. Accordingly, the heat generated in the output diode D1 is increased, and the forward voltage of the output diode D1 is decreased such that the output current id1 may be further increased.

At the time T1, the adjuster current IADJ is supplied to the oscillator 130, and the charging speed of the capacitor COSC is increased such that the increasing slope of the oscillator voltage VOSC is increased. The increasing slope of the oscillator voltage VOSC is increased such that the oscillator voltage VOSC arrives at the peak voltage VP within a faster time than before the time T1.

The oscillator voltage VOSC arrives at the minimum voltage VL at the time T1, and the high side switch M1 is turned on at the time T2 after a predetermined dead time. The oscillator voltage VOSC arrives at the peak voltage VP at the time T3, and the high side switch M1 is turned off at that time.

Thus, the duty of the high side switch M1 is decreased compared with the former at time T1 such that the peak of the output current id1 is decreased. As shown in FIG. 4, the duty of the high side switch M1 before the time T1 is "DM1". After the time T1 the duty of the high side switch M1 becomes "DM2" by the adjuster current IADJ. The output current id1 is decreased due to the decrease of the duty.

After the oscillator voltage VOSC arrives at the peak voltage VP at the time T3, the low side switch M2 is turned on at the time T4 after the dead time. The decreasing slope of the oscillator voltage VOSC is the same before the time T1 such that the peak of the output current id2 is not largely changed. In FIG. 4, the peak is somewhat increased, however this may be a change due to an external factor such as a change of a load.

The oscillator voltage VOSC arrives at the minimum voltage VL at the time T5 such that the low side switch M2 is turned off, and the high side switch M1 is turned on at the time T6 after the dead time, and thereby the output current id1 starts to flow. The oscillator voltage VOSC arrives at the peak voltage VP at the time T7 such that the high side switch M1 is turned off.

The low side switch M2 is turned on at the time T8 and turned off at the time T9.

As described above, the duty of the high side switch M1 is decreased by the adjuster current IADJ. Resultantly, the peaks of the output current id1 and the output current id2 are similar to each other such that the heat between the output diode D1 and D2 becomes similar.

The drawings and the detailed description described above are examples for the present invention and are provided to explain the present invention, and the scope of the present invention described in the claims is not limited thereto. Therefore, it will be appreciated by those skilled in the art that various modifications may be made and other equivalent embodiments are available. Accordingly, the actual scope of the present invention must be determined by the spirit of the appended claims.

DESCRIPTION OF SYMBOLS resonant converter 10, high side switch M1, low side switch M2 switch control unit 100, feedback loop 200, transformer 300 output diode D1 and D2, primary coil Co1 secondary coil Co21 and Co22 capacitor COUT, COSC, first gate driver 110, second gate driver 120 oscillator 130, duty adjuster circuit 140, SR flip-flop 137 error amplifier 131 and 141, current mirror 132 dependent current source 133 and 134 transistor M, switch CS, DS, comparator 135 and 136, inverter 138 reference current source 142, adjuster resistor RADJ

What is claimed is:

1. A duty adjuster circuit adjusting duty of first and second switches in a converter supplying output power according to a first output current and a second output current generated according to each switching operation of the first switch and the second switch, comprising:
    an error amplifier generating an adjuster current that compensates a difference between the first output current and the second output current; and
    a means generating information corresponding to the difference as an input of the error amplifier,
    wherein the first output current flows through a first output diode and the second output current flows through a second output diode.

2. The duty adjuster circuit of claim 1, wherein the means generating the information corresponding to the difference is an adjuster resistor set up as a predetermined value to compensate a difference between peaks of the first output current and the second output current.

3. The duty adjuster circuit of claim 2, wherein the duty adjuster circuit further includes a reference current source supplying a reference current to the adjuster resistor, and the error amplifier amplifies a difference between an adjuster voltage generated in the adjuster resistor and a predetermined reference voltage to generate the adjuster current.

4. A converter comprising:
    a first switch and a second switch;
    a transformer including a primary coil connected to the first and second switches and a secondary coil connected to an output terminal;
    an oscillator generating a duty signal controlling each switching operation of the first switch and the second switch; and
    a duty adjuster circuit supplying an adjuster current to the oscillator that compensates a difference between a first output current of which a current flowing in the secondary coil is rectified through a first output diode during a turn-on period of the first switch and a second output current of which the current flowing in the secondary coil is rectified through a second output diode during a turn-on period of the second switch.

5. The converter of claim 4, wherein the duty adjuster circuit includes:
    an error amplifier generating the adjuster current to compensate a difference between a peak of the first output current and a peak of the second output current; and an adjuster resistor set up as a predetermined value to compensate the difference between the peaks.

6. The converter of claim 5, wherein the duty adjuster circuit further includes a reference current source supplying a first reference current to the adjuster resistor, and the error amplifier amplifies a difference between an adjuster voltage generated in the adjuster resistor and the predetermined reference voltage to generate the adjuster current.

7. The converter of claim 6, wherein the oscillator includes a capacitor charged and discharged according to a second reference current generated according to a feedback signal corresponding to an output voltage of the converter to generate an oscillator voltage, and the duty adjuster circuit supplies the adjuster current to the oscillator to charge or discharge the capacitor according to the difference between the peak of the first output current and the peak of the second output current.

8. The converter of claim 7, wherein the oscillator changes a level of the duty signal if the oscillator voltage arrives at a predetermined peak voltage or a predetermined minimum voltage.

9. A converter comprising:
a first switch and a second switch;
a transformer including a primary coil connected to the first and second switches and a secondary coil connected to an output terminal;
an oscillator generating a duty signal controlling each switching operation of the first switch and the second switch; and
a duty adjuster circuit sensing a difference between a first output current of which a current flowing in the secondary coil is rectified through a first output diode during a turn-on period of the first switch and a second output current of which the current flowing in the secondary coil is rectified through a second output diode during a turn-on period of the second switch, and supplying an adjuster current to the oscillator that compensates a difference between the first output current and the second output current.

10. The converter of claim 9, wherein the duty adjuster circuit includes: an error amplifier generating the adjuster current to compensate a difference between a peak of the first output current and a peak of the second output current; and a peak error amplifier generating an output voltage corresponding to the difference between the peak of the first output current and the peak of the second output current.

11. The converter of claim 10, wherein the error amplifier amplifies a difference between the output voltage of the peak error amplifier and a predetermined reference voltage to generate the adjuster current.

12. The converter of claim 11, wherein the oscillator includes a capacitor charged and discharged according to a second reference current generated according to a feedback signal corresponding to an output voltage of the converter to generate an oscillator voltage, and the duty adjuster circuit supplies the adjuster current to the oscillator to charge or discharge the capacitor according to the difference between the peak of the first output current and the peak of the second output current.

13. The converter of claim 12, wherein the oscillator changes a level of the duty signal if the oscillator voltage arrives at a predetermined peak voltage or a predetermined minimum voltage.

* * * * *